US012460158B1

(12) United States Patent
Snell

(10) Patent No.: US 12,460,158 B1
(45) Date of Patent: Nov. 4, 2025

(54) COMPOSITION AND METHOD FOR ROAD FILM REMOVAL IN A TOUCHLESS VEHICLE WASH COMPRISING A SODIUM HYPOCHLORITE/ANIONIC SURFACTANT CLEANING SOLUTION

(71) Applicant: Lloyd B Snell, New Kensington, PA (US)

(72) Inventor: Lloyd B Snell, New Kensington, PA (US)

( * ) Notice: Subject to any disclaimer, the term of this patent is extended or adjusted under 35 U.S.C. 154(b) by 0 days.

(21) Appl. No.: 19/096,500

(22) Filed: Mar. 31, 2025

(51) Int. Cl.

| | |
|---|---|
| ***C11D 1/37*** | (2006.01) |
| ***C11D 1/12*** | (2006.01) |
| ***C11D 3/00*** | (2006.01) |
| ***C11D 3/04*** | (2006.01) |
| ***C11D 3/06*** | (2006.01) |
| ***C11D 3/12*** | (2006.01) |
| ***C11D 3/33*** | (2006.01) |

(52) U.S. Cl.
CPC ................ *C11D 3/046* (2013.01); *C11D 1/12* (2013.01); *C11D 3/0047* (2013.01); *C11D 3/044* (2013.01); *C11D 3/06* (2013.01); *C11D 3/1246* (2013.01); *C11D 3/33* (2013.01); *C11D 2111/14* (2024.01); *C11D 2111/44* (2024.01)

(58) Field of Classification Search
CPC .... C11D 1/29; C11D 1/12; C11D 1/37; C11D 1/83; C11D 1/88; C11D 1/90; C11D 3/0047; C11D 3/0094; C11D 3/046; C11D 3/33; C11D 3/395; C11D 3/3951; C11D 3/3953; C11D 2111/14; C11D 2111/16; C11D 2111/18; C11D 2111/40; C11D 2111/42
See application file for complete search history.

(56) References Cited

U.S. PATENT DOCUMENTS

| | | | | |
|---|---|---|---|---|
| 4,005,028 | A * | 1/1977 | Heckert | C11D 3/162 510/180 |
| 6,200,941 | B1 * | 3/2001 | Strandburg | C11D 3/10 510/237 |
| 6,342,473 | B1 * | 1/2002 | Kott | C11D 1/22 510/357 |
| 6,511,953 | B1 * | 1/2003 | Fontana | C11D 1/722 510/369 |
| 7,951,245 | B2 | 5/2011 | Levitt et al. | |
| 9,222,176 | B2 * | 12/2015 | Tyborski | C23G 1/20 |
| 2002/0193270 | A1 * | 12/2002 | Cermenati | C11D 3/3956 510/466 |
| 2012/0138103 | A1 * | 6/2012 | Goyal | B08B 5/02 134/30 |
| 2018/0245021 | A1 * | 8/2018 | Stokes | C11D 3/044 |
| 2018/0245022 | A1 * | 8/2018 | Stokes | C11D 3/044 |

* cited by examiner

*Primary Examiner* — Charles I Boyer
(74) *Attorney, Agent, or Firm* — Karen Tang-Tai Sutton

(57) ABSTRACT

An aqueous vehicle cleaner for removing a wide range of different types of traffic film using a variety of manual or mechanical washing systems. The aqueous vehicle cleaner includes at least one anionic surfactant that is selected from the preferred group consisting of linear alkyl benzyl sulfonates, alpha olefin sulfonates, secondary alkane sulfonates and alkyl sulfates, or selected from a more general group consisting of linear alkyl benzyl sulfonates, alpha olefin sulfonates, secondary alkane sulfonates, alkyl sulfates, alkyl ether sulfates, phosphate esters, alkyl ethoxy carboxylates, sulfosuccinates, a sodium-based cleaning agent, 12.5% sodium hypochlorite by weight, and an alkaline agent such that the aqueous vehicle cleaner has a pH of 11.5. Optional additional ingredients may include a chelating agent, preferably an aminocarboxylic acid chelating agent, at least one non-ionic or amphoteric surfactant, at least one hydrotrope, and at least one silicate. No cationic surfactants are included.

17 Claims, No Drawings

COMPOSITION AND METHOD FOR ROAD FILM REMOVAL IN A TOUCHLESS VEHICLE WASH COMPRISING A SODIUM HYPOCHLORITE/ANIONIC SURFACTANT CLEANING SOLUTION

CROSS-REFERENCE TO RELATED APPLICATIONS

NA

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A COMPACT DISC OR AS A TEXT FILE VIA THE EFS WEB SYSTEM

NA

STATEMENT REGARDING PRIOR DISCLOSURES BY THE INVENTOR OR A JOINT INVENTOR

NA

BACKGROUND OF THE INVENTION

Field of the Invention

The present invention relates to compositions and methods useful in the removal of road film and dirt from vehicles such as cars, trucks, motorcycles, snowmobiles, bicycles, vans, buses, trailers, railway trains and the like. These compositions and methods may be used manually, with hand operated cleaning equipment or in automatic cleaning equipment without the assistance of mechanical action. The methods of the invention may be practiced with a) low pressure, no contact cleaning methods, b) high pressure scrubbing application of the compositions, c) friction wash with low or high pressure fluid application, d) presoak cleaning in 'touchless' and friction-type vehicle washes, e) clean-in-place (closed environment) washing systems, especially for aluminum, or any variation of cleaning formats known within the art.

Background Art

It is desirable to keep the exposed surfaces of vehicles clean for reasons which include at least maintaining the appearance of the vehicle, minimizing surface tarnishing of the vehicle, reducing paint wear and fading, and preventing corrosion on the vehicle. Each of these adverse effects on vehicles are at least in part contributed to by materials which collect on the vehicle during use and storage. It is well known that regular surface care and washing of the vehicle can assist in maintaining the appearance of the vehicle and can even extend its useful life where corrosion damage is concerned. It is therefore desirable to have products available to the market place which can assist in the cleaning and washing of vehicle surfaces.

Unfortunately, the roadways are not uniform in the materials which contribute to the deposits left on vehicles. The composition of materials transferred from the roadways to cars (often along with moisture from the surface of the roadway) also changes with the seasons. The more obvious changes in the compositions of the road surface contaminants transferred to vehicles occur during the winter season, when anti-icing materials (e.g., salt, pumice, organic solvents such as ethylene glycol from anti-freeze solutions, sand) are regularly applied to the roadways. The salt used on roadways often contains mineral oils or vegetable oils as an additive. Less obvious roadway contaminants may appear where agricultural materials used on fields in the spring and summer months may run onto the road surfaces. Incompletely burned hydrocarbons, leaking vehicle fluids, and spills also contribute to the mix of road dirt which can be transferred onto vehicles. This vast variation in possible materials which may accumulate on cars is also complicated by the fact that soil compositions vary from region to region.

It is commercially undesirable to be required to provide a vast array of cleaning solutions or concentrates from which cleaning solutions must be prepared which have to be chosen on the basis of the type of road film which is thought to be present on a vehicle. The use or need for a wide range of different cleaning solutions requires increased work in designing, packaging and formulating specific cleaning compositions, and additionally requires the users to select the appropriate cleaning solutions for each particular vehicle to be cleaned, complicating service.

It is therefore important to attempt to provide cleaning solutions with the widest range of capability with respect to the removal of the most common types of road film and dirt from vehicles. This is a difficult task because as previously noted, the components of the road film might comprise organic materials, inorganic materials, hydrophilic materials, hydrophobic materials, acidic materials, or basic materials and thus there is no one uniform definition or composition for road film. Therefore, designing cleansing compositions for the removal of road film from vehicles having a broad range of applicability for the different types of film which may be deposited on the vehicles has been a difficult task.

It has been noted that some mechanical action and/or aggressive fluid application pressure may be necessary in some applications to remove road film. This can also complicate the compounding of the solutions as certain ingredients useful at lower pressure applications may cause foaming when used with stronger mechanical forces or higher pressure applications. If too high a fluid application pressure is used, the pressure can damage the surface without removing the road film. Prior cleaners remove some dirt but the road film was not completely removed.

Additionally, attempts at providing cleaning solutions which are compatible with the cleaning of such significantly different soil compositions have encountered problems wherein the ingredients of the proposed cleaning solutions are incompatible, either reacting with one another or separating during storage. The use of hydrofluoric (HF) acid solutions, although effective in cleaning certain clear metal surfaces, may be avoided where possible in commercial operations and requires careful control in industrial settings because of the corrosive strength of the HF.

These efforts include U.S. Pat. No. 4,093,566 to McNamara et al describes a phosphate-free spray cleaner for metals utilizing sodium metasilicates, sodium carbonate and EDTA dissolved in water with an ethoxylated wetting agent. U.S. Pat. No. 4,153,571 to Garvin et al describes a heat dependent alkali gel cleaning composition based on alkali metal hydroxides and various nonionic surfactants. Also, U.S. Pat. No. 4,099,985 to Garvin et al describes the combination of sodium metasilicate, alkali metal hydroxide and non-ionic surfactants in an aqueous system for cleaning metal surfaces. U.S. Pat. No. 4,284,435 to Fox describes a cleaning composition and method for removing road film from transportation vehicles without the necessity of mechanical brushing or wiping of the surface using high pressure spray equipment. The composition comprises 2 to 30% by weight of chelating agent; 1 to 12% by weight of a bis(ethoxylated) quaternary ammonium compound; 0.5% to 5% by weight ethoxylated alcohol nonionic surfactant; 0-5% by weight sodium metasilicate and water. This concentrate is diluted with water and applied to the surface at a pressure of above 400 psi. Among the chelating agents described are ethylenediamine tetraacetic acid (EDTA) and its salts and hydroxyethylenediamine triacetic acid (HEDTA) and its salts. U.S. Pat. No. 3,123,640 to Longley and U.S. Pat. No. 3,141,905 describe cation-active surface active chemical compounds, the latter patent specifically describing their use for bactericidal, germicidal, antiseptic, algaecidal, fungicidal, textile softening, corrosion inhibition, antistatic, emulsifying, foam modifying, ore beneficiation, and various other purposes. The cation-active compounds are quaternary ammonium compounds derived from lower monoalkyl dialkanolamines. The cation-active compounds include a) dialiphatic, dialkoxylated quaternary ammonium compounds, and b) monoaliphatic, trialkoxylated quaternary ammonium compounds, as described by formulae in the patents.

One other significant problem with the design of washing solutions is that when the cleaning product to be used in a wash is must remove materials with different properties (e.g., water-soluble and oleophilic materials), the ingredients for the wash solution are likely to be incompatible and thus instability in the stored washing compositions and in the diluted wash solutions is highly likely. This instability may take the form of reactivity between ingredients and physical incompatibility between compounds which leads to separation of components or phases. These incompatibility effects can lead directly to reduced performance in the washing process and variability in the performance of the washing process. In other cases, the addition of one component creates new issues in the wash-dry cycle. For instance, U.S. Pat. No. 7,951,245 B2 to Levitt, requires at least one cationic surfactant, whose use in touchless car washes results in unsightly spot from residual water flash drying on the vehicle surface when air jets are used. All car wash formulations include cationic surfactants and car owners are forced to quickly hand dry their vehicles after washing or live with spot.

What is needed is a concentrate and also a ready-to-use or diluted formulation for an aqueous vehicle cleaner which can remove a wide range of different types of traffic film suitable for use with a variety of different washing methods, including low pressure application, hand pressure application, water jet spray apparatus or other manual or mechanical washing systems and which does not contain cationic surfactants.

DISCLOSURE OF INVENTION

The present invention describes a concentrate and a ready-to-use or diluted formulation for an aqueous vehicle cleaner which can remove a wide range of different types of traffic film using either low pressure application, hand pressure application, water jet spray apparatus or other manual or mechanical washing systems. The compositions of the present invention may comprise, for example, one or more solutions that each or collectively contain or comprises:

a) at least one anionic surfactant selected from the preferred group consisting of linear alkyl benzyl sulfonates, alpha olefin sulfonates, secondary alkane sulfonates and alkyl sulfates, or may be selected from a more general group consisting of linear alkyl benzyl sulfonates, alpha olefin sulfonates, secondary alkane sulfonates, alkyl sulfates, alkyl ether sulfates, phosphate esters, alkyl ethoxy carboxylates, sulfosuccinates;

b) a sodium-based cleaning agent;

c) 12.5% sodium hypochlorite by weight; and d) an alkaline agent.

Optional additional ingredients may comprise some or all of the following: at least one polycarboxylic acid chelating agent (preferably an aminocarboxylic acid chelating agent), at least one non-ionic or amphoteric surfactant, at least one hydrotrope, and at least one silicate. The alkaline agent may provide a pH of 11.5 when the finished product is diluted to 5% by weight in water. The concentrate formulation may be provided as a two-part solution. Certain formulations have been found to be shelf stable as one-part concentrate or ready-to-use solutions, even with significantly different properties amongst the components. The compositions may optionally and preferably contain silicates such as metasilicates, orthosilicates (such as in the form of sodium or potassium metasilicate or sodium or potassium orthosilicate) or other materials to buffer or support the alkalinity of the solution up to about 1-2% by weight in the diluted solution, and to provide additional metal protection. The compositions of the invention are also used in cleaning processes for surfaces, especially vehicle surfaces in car wash systems. The compositions are used in such processes where there are multiple liquid application steps and where at least one of the liquid applications comprises at least one composition according to the present invention.

DETAILED DESCRIPTION

The present invention relates to a cleaning product which may be provided in a concentrate, liquid, powder, solid or ready-to-use formulation, the product capable of cleaning a wide range of soil-film, dirt, oils, deposits and the like from vehicle surfaces with minimal damage to the vehicle surface, while using less aggressive materials than hydrofluoric acid. The invention comprises an aqueous solution, powder or solid (including the possibility of alcohol or other organic solvents present in combination with the water) with at least three active components therein. The at least three active components are comprised of at least one anionic surfactant, sodium hypochlorite liquid, and an alkaline agent to provide a pH of 11.5 when diluted to 5% by weight of total additives to water. There are additional optional additives, some of which are preferred such as at least one polycarboxylic acid chelating agent (preferably an aminocarboxylic acid chelating agent), at least one non-ionic or Zwitterionic surfactant, and other additives defined herein. The compositions of the present invention may include those that comprise, for example, one or more solutions that each or collectively contain or comprises:

a) at least one anionic surfactant selected from the group consisting of linear alkyl benzyl sulfonates, alpha olefin sulfonates, alkyl sulfates, and secondary alkane sulfonates;
b) sodium hypochlorite liquid;
c) an alkaline agent;
d) a sodium-based cleaning agent; and
d) a preferred optional ingredient, such as a chelating agent, particularly a chelating agent for monovalent, divalent and trivalent metal ions.

The present invention also comprises a process for the cleaning of a surface, especially a hard surface, more especially a painted hard surface, and most especially a painted vehicle surface (e.g., a car, truck bus, lorry, bicycle, van, mini-van, wagon, etc.). At least one of the composition(s) used in the cleaning of these surfaces is sodium hypochlorite liquid.

There are numerous different classes of vehicle and article cleaning formats that are known in the commercial and vehicle cleaning field of technology. The compositions of the present invention, particularly where metal surfaces (including painted or coated metal surfaces, as well as raw or anodized surfaces, such as aluminum) or composite surfaces are desired to be cleaned, and especially the exterior surfaces of vehicles are to be cleaned, are particularly effective and beneficial. General areas of use for these materials and processes include, but are not intended to be literally limited to presoak washes, preliminary washes, substantive washes, post washes, and rinses used in vehicle washes (including 'touchless,' low pressure, intermediate pressure, high pressure, friction-assisted, and friction washes), apparatus and utensil washes, wheel and rim cleaning washes in automated and/or manual systems, undercarriage washes, special carbon-soil film removal (for vehicles, especially for cars, trucks, motorcycles, trains, and off-road vehicles such as ATV's and snow-mobiles), and rust or stain removal (especially as used in truck washing). The cleaning environment may include outside (i.e. unenclosed) wash systems, housed (enclosed) wash units, transient wash systems (e.g., where the vehicles move in assembly-line, conveyed fashion through the system, or clean-in-place systems where the vehicle, device or apparatus is placed into a closed environment and the cleaning steps are performed on the vehicle device or apparatus while it is confined within the environment. In the clean-in-place systems, the various cleaning solutions may be used once before discarding, be partially recycled (mixed with refreshing solution and partially recycled), or be completely recycled, until they are determined to be spent. The spent or partially spent waste liquids may be reclaimed for separation of components or discarded in an environmentally acceptable manner.

The sodium hypochlorite liquid is an ingredient of particular note within the practice of the present invention. Sodium hypochlorite liquid is commercially available, for example, as a liquid swimming pool chlorinator, sodium hypochlorite is available in a 10% liquid solution at most pool supply stores. Sodium hypochlorite is also available in grocery stores as an additive for laundry processing: Chlorox (5%). Sodium hypochlorite 12.5% solution is used by municipal water treatment facilities for treating waste water before returning it to nature. Sodium hypochlorite is also used as a disinfectant for drinking water, although that is not its purpose in this invention. In the present invention, at an application of 0.5% to the vehicle, sodium hypochlorite reduces carbon and other organic contaminants for easy removal with water rinsing. The cleaning solution of the present invention is contrasted to the prior art cleaning solutions for vehicles, such as the one described in U.S. Pat. No. 7,951,245 B2 to Levitt, which includes potassium cocoate, an organic ingredient that would be consumed if mixed with the sodium hypochlorite of the present invention. Levitt's solution also requires at least one cationic surfactant, whose spot creation during the drying step are disadvantageous and why the inventor was determined to create a cleaning solution without cationic surfactants.

Anionic surfactants are materials well known in the cleaning, detergent, and general materials composition art. A surfactant is generally defined as any compound which when added to water or an aqueous solution increases the spreading or wetting properties of water or the aqueous solution, usually as measured by reducing the surface tension of the liquid. Surfactants often comprise two segments, one segment which is hydrophilic and another which is hydrophobic. Where the segment of the surfactant which is most active in reducing the surface tension of the water contains or comprises an anion (e.g., dodecylbenzenesulfonate), the surfactant is referred to in the art as an anionic surfactant. Where the most active segment is cationic, the surfactant is referred to as a cationic surfactant, and where the most active portion is non-ionic or amphoteric (having both anionic and cationic species), the surfactant is referred to as a non-ionic or amphoteric surfactant, respectively. The anionic surfactant is generally used in an amount which would provide 18 by weight of the applied solution. Where the concentrate may be diluted from 1 to twenty or more times, the concentration of the anionic surfactant in the concentrate may be, for example, 5% by weight of the concentrate solution.

Examples of anionic surfactants include organic carboxylates, organic sulfonates, organic sulfates, organic phosphates and the like, particularly linear alkyl aryl sulfonates, such as alkyl aryl carboxylates, alkyl aryl sulfonates, alkyl aryl phosphates, and the like. It has been found that only certain anionic surfactants maximize the benefits of the present invention. These classes of anionic surfactants are known within the surfactant art as linear alkyl benzyl sulfonates (LABS), alpha olefin sulfonates (AOS), alkyl sulfates, and secondary alkane sulfonates. These are art recognized classes well understood by the ordinary surfactant chemist.

The preferred chelating agents for metal ions include polycarboxylic acid chelating agents and include such natural occurring materials as citric acid and malic acid (and their equivalents) and such conventional synthetic materials such as the aminocarboxylic acid or amine-type carboxylic acid or amine-type acetic acid chelating agents such as acid (EDTA), diethylenetriaminepentaacetic acid (DTPA), hydroxyethylenediaminetriacetc acid (HEDTA), and the many other chelating carboxylic acids known in the art. A good background on the structure and types of the chelating amine-type carboxylic acids is provided in U.S. Pat. No. 5,013,622 and Archiv der Pharmazie 307 (5), pp. 336-340, 1974. The chelating carboxylic acid is generally used in an amount of 1% by weight of the applied solution. Where the concentrate may be diluted from 1 to twenty or more times, the concentration of the chelating acid in the concentrate may be, for example, 5% by weight of the concentrate solution. The chelating acids are often provided as metal salts, especially sodium or potassium salts of the acids, such as trisodium hydroxyethylenediaminetriacetate. Amino phosphonates are also suitable for use as chelating agents in the compositions of the invention and include aminotris (methylene phosphonate) (ATMP), ethylenediaminetetra (methylenephosphonates) (EDTMPA), diethylenetriamine- N, N,N',N",N"-penta(methylene phosphonate) (DETPMP) and 1-hydroxyethane-1,1-diphosphonate (HEDP). Preferably, these amino phosphonates do not contain alkyl or alkenyl groups with more than about 6 carbon atoms.

Non-ionic and amphoteric surfactants are also well known in the art. Many of these may contain polyoxyalkylene chains within the molecule, with appropriate end groups altering the hydrophilic/hydrophobic balance of the compound. The oxylakylene component is often selected from oxypropylene (CH2 CH2 CH2-O—) or oxyethylene (CH2 CH2-O—) linkages, preferably with the majority or entirety of the groups in the oxyalkylene chain being oxyethylene linkages. More specific known classes of these non-ionic surfactants are known in the literature as non-ionic alkoxylates, non-ionic alkylphenol polyethers, alcohol alkoxylates (e.g., specifically alcohol ethoxylates and alcohol propoxylates and mixed ethoxylates/propoxylates), non-ionic condensates of branched chain primary or secondary alcohols and alkylene (especially ethylene) oxides, alkoxylated amines, amine oxides, non-ionic condensates of fatty acids and alkylene oxides, and the like. Examples of such nonionic surfactants are found in "Surface Active Agents and Detergents," Volumes I and II, Interscience Publications and U.S. Pat. Nos. 2,992,108; 3,068,101; 3,210,152; 3,165,409; and French Patent Nos. 1,556,240 and 1,497,930. Amphoteric surfactants are also well known in the literature and include, merely as examples thereof, betaines (such as amidoalkyl betaines), and the like. Examples of such compounds are found in U.S. Pat. No. 3,573,049. The non-ionic surfactant is generally used in an amount which would provide from about 3% by weight of the applied solution (the diluted solution or ready-to-use solution). Where the concentrate may be diluted from 1 to twenty or more times, the concentration of the non-ionic surfactant in the concentrate may be, for example, 10% by weight of the concentrate solution. Dehypon™ LS-54 having (a C12-14, Ethylene Oxide (EO) Propylene Oxide (PO), with distributions of about (EO) 5-(PO) 4) has been found to be particularly beneficial, as has Videt RFG (roughly determined to be an estimated C12-15, Ethylene Oxide (EO), with about (EO) g and possibly a phosphate ester grouping). The Dehypon™ LS-54, in combination with cationic surfactants in the present invention, particularly the polyoxyalkylene ammonium cationic surfactants such as the GlenSurf 42 (described above) has been found to provide a significant and unexpectedly enhanced effect in the overall performance of carrying the detergent action to the surface, particularly through road film. Videt RFG would be a less desirable alternative to the Dehypon™ LS-54.

The alkaline agent to provide a pH of 11.5 may comprise any of the many alkaline agents known in the art, but preferably comprises one or more metal phosphates, metal carbonates, and metal hydroxides, particularly alkali or alkaline metal hydroxides such as NaOH and KOH. The weight percentage of the pH control agent depends upon the strength of the agent and the target goal for the pH. Generally, the pH control agent may be used in weight percentages of 0.5% by weight of the dilute solution, 0.5% by weight of the diluted solution will deliver a pH of 11.5. This would convert to about 3% by weight pH agent of the concentrate. Meanwhile, the cleaning agent is sodium-based, either a sodium-based alkaline salt such as sodium tripoly phosphate or trisodium phosphate, or a sodium-based surfactant such as sodium dodecylbenzenesulfonic acid, sodium alpha olefin sulphonate, and sodium lauryl ether sulphonate, just to name a few. Importantly, ammonium-based surfactants are incompatible with sodium hypochlorite. Some of the amphoterics and nonionics become sodium-based once introduced to a sodium based system.

The above composition is usually provided as 2 concentrates designed to be diluted with water. The ratio of concentrate to water is within the range from about 1:30 to 1:20 but may be diluted to any proportion within that range or less efficiently diluted by a lesser amount (e.g., 1:2). The present invention is able to provide an efficient cleaning composition especially adapted to remove road film which may have a wide range of components from transportation vehicle surfaces. The cleaner may effectively remove traffic film without damaging painted surfaces.

The composition of the present invention is useful in cleaning vehicle surfaces by any type of pressure spraying or non-pressure application with an aqueous solution or a water concentrate mixture having a temperature of as low as 1° C., although higher temperature water up to 95° C. can be utilized. Generally, it has been found that water having a temperature of from 20° C. to 60° C., is preferred, with water having a temperature of from 40° C. to 50° C., being most preferred. It is within these preferable ranges that an energy savings results as hot water need not be utilized to clean the vehicles.

The composition in the present invention can be either pre-diluted before being introduced to the pressure spray apparatus or can be mixed in situ during spraying. Generally, from 1 part concentrate mixed with 30 to 20 parts water will provide the most effective cleaning. The exact amount depends on the water hardness, the type of soil in the traffic film, the concentration of actives in the concentrate and the like, i.e., with harder water, a more concentrated solution must be used. Also, with soils containing particular metals, a higher concentration is desirable for most effective cleaning. Nevertheless, satisfactory results can be obtained using dilutions within the above range although 1:30 to 1:20 is most preferred.

The processes used in the cleaning industry, such as industrial cleaning, spray washing, mechanical washing, vehicle washing (both automatic and hand-washing, no-touch or mechanical, low pressure, moderate pressure or high pressure), utensil or machine part washing, and the like is usually performed in a number of steps used in sequence and in various combinations. It is not unusual for five or more liquid applications to be applied during a complete wash cycle. For example, there may be a first preparatory application (prep wash, prep gun, presoak, prep rinse or pre-rinse) which comprises, for example, only water; water and detergent; water and builder (e.g., phosphate); water, detergent, and builder; and these solutions with surfactants therein. There may also be as a second (or first) step a presoak (or soak, or full soak), even after the prep rinse. This application often comprises the major application of detergent/surfactant in aqueous solution (and some or all optional materials such as chelating agents, solvents, etc.), although non-aqueous, organic solutions may be used. The third possible step (or first or second step) that might be used comprises a main wash application, which usually would follow the pretreatment(s) of either the prep rinse and/or soak application, with little or no time delay between steps, although minutes may often pass between steps, even though this is not preferred from a time usage standpoint or wetting standpoint of the solutions and treatments. The main wash may contain most or all of the primary active agents and the optional agents as desired for the specific process and as listed above. Another application (e.g., a possible fourth step) in this sequence may be a "clear coat" application, often comprising a non-ionic surfactant, anionic surfactant, optional quaternary compound, buffering agent or pH control agent, solvent, and the like. Any of these steps or combinations of steps may then be followed by a possible fifth step such as a rinse step, with the application comprising water (alone), some lower concentration or solvents and detergents than in one or more of the previous applications, and generally lower concentrations of additives. Another optional step (e.g., a possible sixth step) would be a drying application step which might include an organic, relatively non-volatile solvent (e.g., mineral seal oil, C1-C6 ester, etc.), water, alkyl, or aryl quaternary ammonium compound, dialkyl quaternary ammonium compound and any of the other optional ingredients. A main purpose of this application is to facilitate removal (e.g., physical removal, as by run-off or air spray assisted run-off) of the liquid from the surface so that spotting from dissolved or carried components is reduced. This more rapid drying is particularly significant since the potential for residue remaining is lessened and the total time of the wash cycle may be reduced by reduction in the critical drying phase at the end of the wash cycle. The solutions may also be used in clean-in-place systems as well as conveyor wash systems or free-standing/open systems.

The use of sodium hypochlorite alone in a water carrier, a solution with water and any surfactant, or in a solution [aqueous or organic] in combination with at least one of the three classes of anionic surfactants, the linear alkyl benzyl sulfonates (LABS), alpha olefin sulfonates (AOS), and secondary alkane sulfonates, e.g., in an aqueous solution having a pH of at least 8.5 (e.g., between 8.5 and 13, between 8.5 and less than 11.5, or between 8.5 and 10.5) into any one of the first five steps described above, particularly the prep rinse, soak, main wash, rinse and clear coat applications can improve drying of the washed structure. This is particularly true when the combination of anionic and sodium hypochlorite is added before or during the main wash. It has also been noted that the addition of sodium hypochlorite to the prep rinse and/or the soak, without the addition of the anionic surfactant species improves drying of the cleaned and washed surface.

The practice of certain aspects of the present invention has been found to provide uniquely beneficial effects in certain specific washing sequences, even where there are already general benefits provided in all washing, rinsing, or cleaning situations. The sodium hypochlorite has been found to provide a particularly unique effect in the washing/rinsing/cleaning/waxing/drying cycles encountered in the washing of vehicle surfaces. When the sodium hypochlorite is present in an effective amount (e.g., greater than 5 parts per million (ppm)) in at least one of a series of liquid application steps in a washing/rinsing/cleaning/waxing/drying sequence, and the application is in any step before drying, the liquid is removed from the washed surface more rapidly (by sheeting, shedding, or physical movement of the liquid rather than evaporation) than with other compositions, and in some cases more completely before active drying (by towels or heated air or air drying). This feature is uniquely beneficial in the surface cleaning industry, and especially the vehicle cleaning industry. As vehicles are washed, cleaned, rinsed and then usually air dried or blown dried. The first method of drying allows for the formation of drying spots or water spots on the surface, if all of the liquid with any solids content has not been removed from the surface before air drying. The same problem occurs to a lesser extent with the blow drying (whether heated or not), and the time and energy involved in extended forced drying is reduced when there is less liquid remaining on the surface at the beginning of forced drying process.

In addition, there is a less quantifiable, but definitely observable benefit in the use of sodium hypochlorite in wash applications, particularly to the car wash bay and equipment. There is a visible improvement in the cleanliness of the wash equipment and surrounding bay when the sodium hypochlorite is present in wash compositions than in similar wash compositions tried. The sodium hypochlorite that is being distributed throughout the bay continues to reduce organics and carbon deposits leaving the equipment, walls, floor, and glass surfaces clean.

DESCRIPTION OF THE PREFERRED EMBODIMENTS

Example 1 Road Film Removal Test: Using a car wash facility, equipped with a new, state of the art Petit touchless high pressure vehicle washing unit, two formulations were tested under normal washing conditions. The first test would be the present invention without the addition of sodium hypochlorite. After completing the wash, the vehicle would be washed again with the addition of a second application consisting of the sodium hypochlorite.

Test Procedure: After the vehicle enters the wash bay, a 5% solution of the current invention is applied through a foaming mechanism with raw, untreated water. The sodium hypochlorite portion of the formula has been withdrawn from the product. This solution is allowed to dwell on the vehicle for 20 seconds. Afterwards, the washing equipment applies water under pressure to wash the chemistry off the vehicle. This is followed by a final rinse of treated, pure water.

After the vehicle dries, the washing process is repeated with a second application of chemistry, that is, the sodium hypochlorite portion of the invention, applied at a 3% concentration with water. The vehicle is rinsed and allowed to dry.

Several different vehicles of various degrees of contamination were used for this experiment. All vehicles had dirty windshields when tested. Windshields are typically used to judge the effectiveness of a detergent because they are transparent and largely made of a same material. Road film is also known to soil windshields more tenaciously due to their weathered surface. Vehicle finishes are less porous, as demonstrated by their various levels of gloss. First wash/second wash results are as follows:

| Vehicle Type | First Wash w/o NaClO | Second Wash w/NaClO |
| --- | --- | --- |
| 2022 Chevy truck | Visible road film on windshield | Clean windshield |
| 2013 Ford Transit | Visible road film on windshield | Clean windshield |
| 2020 Kia | Visible road film on windshield | Clean windshield |
| 2016 Honda Accord | Visible road film on windshield | Clean windshield |
| 2011 Jeep | Visible road film on windshield | Clean windshield |
| 2018 Ford F-150 | Visible road film on windshield | Clean windshield |

Since the test, the car wash has washed 14,500 vehicles without a single complaint about the wash quality. Before using this invention, complaints were daily. In order for testing to be complete in the car wash, the product needs to be tested for several months, to experience the change of seasons from Fall through winter, to expose the product to the different road film characteristics.

It is to be understood that the above-described arrangements are only illustrative of the application of the principles of the present invention. Numerous modifications and alternative arrangements may be devised by those skilled in the art without departing from the scope of the present invention. For instance, the term "car wash" includes any wash-dry system for vehicles, and the term "car" includes "vehicles".

What is claimed is:

1. A method for washing and drying a vehicle surface using a touchless wash-dry system, the method comprising:

A) a touchless washing step; and

B) a touchless drying step;

wherein the touchless washing step comprises pressure-spraying at least two aqueous solutions to the vehicle surface without subsequent mechanical action by any equipment that touches the vehicle surface; wherein at least one of the two aqueous solutions is a cleaning solution in a concentrate formulation or a ready-to-use formulation comprising:

i) at least one anionic surfactant selected from the group consisting of linear alkyl benzyl sulfonates, alpha olefin sulfonates, secondary alkane sulfonates, alkyl sulfonates, alkyl ether sulfates, phosphate esters, alkyl ethoxy carboxylates, sulfosuccinates, or mixtures thereof;

ii) an additional cleaning agent;

iii) greater than 5 ppm sodium hypochlorite; and iv) an alkaline agent in an amount sufficient to provide the cleaning solution with a pH of 11.5;

and the drying step (B) comprises using only pressurized air directed at the vehicle surface after the washing step to dry the vehicle surface.

2. The method of claim 1, wherein the ready-to-use formulation is diluted to 5% by weight in water.

3. The method of claim 1, wherein the concentrate formulation of the cleaning solution is provided as a two-part solution adapted to be diluted with water at a concentrate formulation to water ratio within a range of 1:30 to 1:20.

4. The method of claim 1, wherein the cleaning solution is a two-part solution comprising an aqueous first part and a solid or powder second part.

5. The method of claim 1, wherein the additional cleaning agent is a sodium-based alkaline salt or surfactant.

6. The method of claim 1, wherein the washing step with the cleaning solution is performed either before or after the second aqueous solution is applied to the vehicle.

7. The method of claim 1, wherein the cleaning solution further comprises from 1-2% of a metasilicate or orthosilicate to buffer or support the alkalinity of the cleaning solution.

8. The method of claim 1, wherein the cleaning solution further comprises alcohol or organic solvents.

9. The method of claim 1, wherein the at least one anionic surfactant of the cleaning solution is present in an amount of 1% by weight of the cleaning solution.

10. The method of claim 1, wherein the cleaning solution further comprises 1% of a chelating agent for the ready-to-use formulation, or 5% by weight of a chelating agent for the concentrate formulation.

11. The method of claim 10, wherein the chelating agent is a polycarboxylic acid, and the cleaning solution further comprises at least one non-ionic or amphoteric or zwitterionic surfactant, at least one hydrotrope, and at least one silicate.

12. The method of claim 11, wherein the polycarboxylic acid chelating agent is an aminocarboxylic acid chelating agent comprising one or more of EDTA, DTPA, or HEDTA.

13. The method of claim 11, wherein the non-ionic surfactant is present in an amount of 3% by weight in the ready-to-use formulation, or 10% by weight in the concentrate formulation.

14. The method of claim 10, wherein the chelating agent is trisodium hydroxyethylenediaminetriacetate, or an amino phosphonate selected from the group consisting of ATMP, EDTMPA, DETPMP, HEDP, or mixtures thereof.

15. The method of claim 1, wherein the alkaline agent is selected from the group consisting of metal phosphates, metal carbonates, metal hydroxides, or mixtures thereof, and wherein the alkaline agent is present in an amount of 3% by weight of the concentrate formulation.

16. The method of claim 15, wherein the metal hydroxide is NaOH or KOH.

17. The method of claim 1, wherein in addition to the washing step, the method may include a preparatory rinse step and/or a soaking step, and either or both of these steps may contain the cleaning solution.

* * * * *